United States Patent Office 2,889,206
Patented June 2, 1959

2,889,206

RECOVERY OF SELENIUM

Martin A. Hobin, Allentown, Pa., assignor to Kawecki Chemical Company, Boyertown, Pa., a corporation of Pennsylvania No Drawing. Application September 30, 1953
Serial No. 383,384

1 Claim. (Cl. 23—209)

This invention relates to the recovery of elemental selenium and, more particularly, to the recovery of elemental selenium from a physical association of the selenium with other solid materials.

In the production of alternating current rectifiers, finely divided elemental selenium is placed in the form of a thin layer on an aluminum base plate and the selenium layer is covered with a metallic coating such as a bismuth-cadmium alloy. The delicacy of the production of such a rectifier is attested by the fact that a substantial portion of the rectifier plates fails to meet specifications and must therefore be scrapped. Heretofore, this rectifier scrap has had no marketable value because its selenium content has been a bar to its salvage as aluminum scrap, and its association with the aluminum and with the alloy coating has deprived it of interest for its selenium value.

Inasmuch as selenium rectifier construction requires electrical separation of the aluminum base plate and the supernatant bismuth-cadmium alloy layer, the intermediate selenium layer is exposed adjacent the edges of the rectifier plate. I have found that a sodium monosulfide solution will attack this exposed selenium layer sufficiently to remove it in large measure from the rectifier scrap. However, when the resulting solution of sodium selenosulfide is subjected to the action of a reagent which converts the sodium monosulfide component of the selenosulfide to some other form such as a sulfate or thiosulfate and thus precipitates elemental selenium, the resulting mass is of such slimy nature that it is virtually impossible to effect separation of the metallic selenium from the other components of this mass by any known commercial filtering or other separation procedure.

I have subsequently endeavored to duplicate this separation of selenium from rectifier scrap material by using sodium sulfite, but I have found that the sulfite does not appreciably attack this scrap material. As an alternative procedure I have investigated the problem of mechanically separating the selenium from either or both of the other metallic components between which it is sandwiched in rectifier material, but I have found that the mechanical separation problem is complicated by the fact that the aluminum base plate is so pliant that conventional mechanical distortion of the scrap material does not effectively loosen any of the components. However, as a result of extensive investigation, I have discovered that if rectifier scrap material is charged to a hammer mill, the scrap is so shredded and disintegrated that there is effected a physical separation of the selenium from the aluminum base plate. The resulting separated elemental selenium can then be separated from adhering or entrained bismuth-cadmium alloy by selective dissolution of the selenium by the conventional procedure of dissolving the selenium in an alkali metal sulfite solution and thereafter precipitating elemental selenium therefrom by the addition of an oxidizing or acidic reagent.

Accordingly, my method of recovering elemental selenium from electric rectifier scrap comprises first subjecting the rectifier scrap to shredding and disintegration in a hammer mill with the resulting mechanical separation of the selenium from the aluminum base plate, and thereafter separating the selenium from the accompanying bismuth-cadmium alloy by a wet separation procedure. This wet separation procedure comprises dissolving the separated elemental selenium in an aqueous solution of an alkali metal sulfite, subsequently precipitating elemental selenium from the resulting aqueous alkali metal selenothiosulfate solution by decomposing the selenothiosulfate component of said solution by the addition of an inorganic acid or an oxidizing agent, and recovering the resulting precipitated selenium.

As mentioned hereinbefore, the mechanical separation of the selenium component of electric rectifier scrap material from the aluminum base plate is effected in a hammer mill. Conventional hammer mill designs have been found to be adequate for this purpose. Because of the type of tearing, shredding, beating and attrition peculiar to these hammer mills, the selenium layer is mechanically separated from the deformable aluminum base plate to which it is bonded. The product of this operation comprises a mixture of shredded aluminum and a fine powder composed of about 50% by weight of selenium and the balance essentially the bismuth-cadmium alloy component of the rectifier material. The finely divided component can be readily separated from the shredded aluminum component by a conventional screening or equivalent mechanical operation.

The thus-separated mixture of elemental selenium and bismuth-cadmium alloy is then subjected to a wet separation process wherein the selenium is selectively dissolved away from the bismuth-cadmium alloy component and this dissolved selenium is subsequently precipitated in the form of metallic selenium. I have found that this wet separation is advantageously effected by the previously know expedient of dissolving it in an alkali metal sulfite to form an alkali metal selenothiosulfate and by subsequently converting this selenothiosulfate to an alkali metal sulfate by the addition of a conversion reagent such as an inorganic acid or an oxidizing agent, or a combination thereof.

Dissolution of the metallic selenium component of the physical association of elemental selenium and other solid material is effected by means of an aqueous solution of an alkali sulfite. Although any of the other alkali metal (or ammonium) sulfites may be used in lieu of sodium sulfite, sodium sulfite has particularly optimum solubility and stability characteristics and is furthermore readily available and relatively inexpensive. For these reasons, sodium sulfite is presently preferred by me for use in the practice of my invention and the subsequent discussion of my method will therefore be directed specifically to the use of sodium sulfite. However, it must be clearly understood that the other alkali metal sulfites may be substituted for sodium sulfite in the following description of the practice of my invention.

The concentration of the aqueous solution of sodium sulfite used in the practice of the method of my invention is not critical. Sodium sulfite in solution appears to be capable of absorbing and combining with one atom of selenium per molecule of sodium sulfite, such a product being that known as sodium selenothiosulfate, $Na_2SeSO_3$. Inasmuch as the selenothiosulfate is substantially as water-soluble as the sulfite, an amount of sodium sulfite which will enter into solution in water will dissolve an amount of selenium up to that corresponding to the molar equivalent quantity of selenothiosulfate while nevertheless remaining in solution. At the other extreme in concentration, that is at very dilute concentrations, the sodium sulfite will combine with the same molar proportion of selenium as at higher concentrations, and consequently the only objection to very dilute sodium sulfite solutions is their comparatively low over-all capacity for dissolving selenium. Accordingly, there is no concentration of sodium sulfite which is critical to the operability of my method, the sole criterion being merely that the more concentrated the sodium sulfite solution the more selenium it will dissolve.

The dissolution of elemental selenium in an aqueous solution of sodium sulfite takes place quite readily. The rate of dissolution of selenium in the sodium sulfite solution may be increased significantly simply by stirring or otherwise maintaining circulation of the aqueous phase and by warming the solution to a temperature of at least about 60° C.

After dissolution of the selenium in the sodium sulfite solution has been effected, it will be found that the non-selenious solid materials physically associated with the selenium remain substantially unattacked by the solution. The selenium-containing solution can thus be readily separated from the other materials with which it was initially associated by filtering the selenium-containing sodium sulfite solution, the solid residue remaining on the filter advantageously being washed with warm water so as to recover all of the selenium-containing solution otherwise entrained in the solid residue. The solid residue may then be subjected to any desired treatment to facilitate or effect recovery of its valuable components. The filtrate and the wash water, on the other hand, contain substantially all of the selenium content of the scrap material and are combined for subsequent treatment to recover their selenium content.

The selenium-containing solution obtained by dissolving a full complement of elemental selenium in the sodium sulfite solution comprises an aqueous solution of a sodium selenothiosulfite. Whatever its specific composition, the solution exhibits the characteristic of being a sodium sufite solution containing up to about one atom of selenium per molecule of sodium sulfite (corresponding to sodium selenothiosulfate) inasmuch as this amount of dissolved selenium is promptly precipitated by any treatment of the solution that has the effect of decomposing the selenothiosulfate by conversion of the sodium sulfite component thereof to some other sodium compound having no affinity for selenium. As soon as the sodium sulfite component of the solution has been oxidized to sodium sulfate, or converted to some other salt of sodium, there is no longer any component in the solution capable of combining with the selenium to hold it in solution.

The decomposition of the sodium selenothiosulfate should be effected by a treatment which at the same time minimizes the formation of elemental sulfur, inasmuch as an excess of free sulfur might otherwise contaminate the precipitated selenium metal. Thus, the decomposition may be effected by an inorganic acid which will convert the sodium sulfite component of the selenothiosulfate to a sodium salt such as sodium sulfate or sodium chloride, or by an oxidizing agent which will oxidize the sodium sulfite to sodium sulfate. For example, the sodium sulfite may be converted to a sodium compound that has no appreciable capacity for combining with selenium in solution by acidifying the selenothiosulfate solution to the extent required to reduce the alkalinity of the solution to a pH of about 5 to 6. Such acidification can be effected by introducing into the solution an inorganic acid such as sulfuric acid, hydrochloric acid, nitric acid, or the like. As the inorganic acid decomposes the sodium selenothiosulfate, elemental selenium precipitates from the solution and may be separated therefrom by conventional filtration procedures. Alternatively, the sodium selenothiosulfate may be decomposed by oxidizing the sodium sulfite component of this compound to sodium sulfate. Oxidation of the sodium sulfite component of the solution may be effected by bubbling chlorine gas into the solution or by adding thereto a solution of a stronger inorganic oxidizing agent such as hydrogen peroxide or potassium permanganate. The addition of the oxidizing agent is continued until the solution has become decidedly acidic, that is, until the pH of the solution is within the range of about 5 to 6. As the sodium sulfite is oxidized to the sulfate, elemental selenium precipitates as a fine powder.

The precipitated elemental selenium may readily be separated from the aqueous solution by conventional separation methods such as decantation, filtration, centrifuging, and the like. Small amounts of colloidal sulfur that may have been formed during the precipitation of the selenium are ordinarily easily removed in the course of the separation of the selenium from the sulfate solution. The selenium recovered by the filtration or other separation procedure is washed and dried and may, if desired, be consolidated by melting into a solid ingot of metal. The selenium thus recovered is of substantially the same purity as it was in the selenium layer of the rectifier scrap and generally analyzes about 99% Se.

The following specific example will illustrate the method of my invention but must not be construed to impose any limitation thereon:

Selenium rectifier scrap, comprising an aluminum base plate covered with a layer of powdered elemental selenium and the selenium layer being covered nearly to the edges of the plate with a layer of a bismuth-cadmium alloy, was charged to a hammer mill to loosen the selenium and bismuth-cadmium alloy components from the aluminum base plate. The action of the hammer mill disintegrated the rectifier scrap by shredding the aluminum base plate and dislodging the supernatant layers of selenium and bismuth-cadmium alloy therefrom. The product of the hammer mill comprised a shredded mass of aluminum plate together with a pulverized mixture of the selenium and the bismuth-cadmium alloy.

The mixture of selenium and bismuth-cadmium alloy was separated from the shredded aluminum base plate and was then subjected to recovery of its selenium content by the wet separation step of the method of my invention. To this end, a sodium sulfite solution was prepared by dissolving 600 parts by weight of anhydrous sodium sulfite (commercial grade) in 1800 parts by weight of water. To this solution there were added 400 parts by weight of the aforementioned finely divided mixture of selenium and bismuth-cadmium alloy. Inasmuch as the selenium represented approximately 50% by weight of the mixture of selenium and bismuth-cadmium alloy, the amount of selenium added to the sodium monosulfide solution was approximately 200 parts by weight. The selenium-containing mixture was digested in the sodium sulfite solution for one-half hour at 75°–85° C., agitation being maintained continuously so as to keep the solid material in suspension in the sulfite solution and thereby facilitate dissolution of the selenium therein. The insoluble bismuth-cadmium alloy was separated from the selenium-containing solution by filtration, the mixture filtering readily. The filter cake was washed with warm water and the wash water was combined with the selenium-containing filtrate. The washed filter cake, when dried, constituted 210 parts by weight, a substantial portion of the gain in weight over the starting weight of the bismuth-cadmium alloy component of the scrap being due to the presence of oxide derived from the aluminum metal base plate of the scrap.

The resulting selenium-containing solution, comprising the aforementioned filtrate and combined wash water, was then heated to about 45° C. and chlorine gas was bubbled into the solution. The solution was continuously stirred and the addition of chlorine gas was continued until the pH of the solution approached about 5.5. Thereupon the chlorine addition was discontinued and the temperature of the solution was raised to about 80°

C. to insure completion of the reaction. This oxidation of the sodium sulfite component of the solution to sodium sulfate was accompanied by the precipitation of fine granular elemental selenium.

The precipitated selenium was allowed to settle for about 15 minutes and then was separated from the supernatant liquid by decantation of the liquid therefrom. The resulting selenium powder was washed and dried and, on analysis, was found to comprise 99% Se.

It will be appreciated that the method of my invention effects not only the desired complete recovery of elemental selenium from rectifier scrap but also effects, incidental to the selenium recovery, the separate recovery of the aluminum and bismuth-cadmium alloy components of this scrap. Thus, the method of my invention offers simple and effective means for recovering selenium from rectifier scrap by a completely intergated method particularly adapted for commercial scale operation.

I claim:

The method of recovering elemental selenium from electric rectifier scrap in which the selenium is in the form of a coating on an aluminum base plate and the selenium is coated with an adherent layer of a bismuth-cadmium alloy, which comprises separating the selenium component and the bismuth-cadmium alloy from the aluminum base plate to make the selenium component more amenable to dissolution by subjecting the electric rectifier scrap to the action of hammers in a hammer mill until the aluminum base plate is shredded and the selenium component and the layer of bismuth-cadmium alloy is separated from the shredded pieces of the base plate in the form of finely-divided particles, separating said finely-divided particles from the shredded pieces of aluminum, maintaining an alkali metal sulfite solution in contact with the separated finely-divided particles until the selenium component has been selectively dissolved with resultant formation of an alkali metal selenothiosulfate solution, separating the alkali metal selenothiosulfate solution from the particles of bismuth-cadmium alloy, decomposing the alkali metal selenothiosulfate of said solution with resultant precipitation of the selenium component thereof as finely-divided elemental selenium, and separating the precipitated finely-divided selenium.

References Cited in the file of this patent

UNITED STATES PATENTS

| | | |
|---|---|---|
| 2,010,870 | Lindblad | Aug. 13, 1935 |
| 2,111,112 | Dudley | Mar. 15, 1938 |
| 2,354,727 | Wulff | Aug. 1, 1944 |

FOREIGN PATENTS

| | | |
|---|---|---|
| 426,669 | Germany | Mar. 6, 1926 |
| 528,501 | Germany | June 30, 1931 |

OTHER REFERENCES

"Comprehensive Treatise on Inorganic Chemistry," Mellor (1930), vol. 10, pages 698 and 699.

Sugie: "Chemical Abstracts," vol. 16, column 4030 (1922).